(12) United States Patent
Torres Carpio

(10) Patent No.: US 10,674,679 B2
(45) Date of Patent: Jun. 9, 2020

(54) PLANT SUPPORT COLLAR

(71) Applicant: A. RAYMOND et Cie, Grenoble (FR)

(72) Inventor: Josep Torres Carpio, GS Joan de Vilatorrada (ES)

(73) Assignee: A. RAYMOND et Cie, Grenoble (FR)

( * ) Notice: Subject to any disclaimer, the term of this patent is extended or adjusted under 35 U.S.C. 154(b) by 127 days.

(21) Appl. No.: 15/519,580

(22) PCT Filed: Nov. 5, 2015

(86) PCT No.: PCT/EP2015/075776
§ 371 (c)(1),
(2) Date: Apr. 17, 2017

(87) PCT Pub. No.: WO2016/071430
PCT Pub. Date: May 12, 2016

(65) Prior Publication Data
US 2018/0177139 A1    Jun. 28, 2018

(30) Foreign Application Priority Data

Nov. 6, 2014 (NL) ...................................... 2013747

(51) Int. Cl.
*A01G 9/12* (2006.01)
*A01G 17/10* (2006.01)
*B33Y 80/00* (2015.01)

(52) U.S. Cl.
CPC ............. *A01G 9/128* (2013.01); *A01G 17/10* (2013.01); *B33Y 80/00* (2014.12)

(58) Field of Classification Search
CPC ........ A01G 9/128; A01G 17/10; A01G 17/12; A01G 9/12
See application file for complete search history.

(56) References Cited

U.S. PATENT DOCUMENTS

| | | | |
|---|---|---|---|
| 1,867,485 A | 7/1932 | Westover | |
| 3,805,340 A * | 4/1974 | Bush ...................... | A01G 17/12 24/543 |
| 4,483,098 A | 11/1984 | Anderson | |
| 5,542,209 A * | 8/1996 | Sheu ...................... | A01G 9/128 24/339 |
| 5,979,110 A | 11/1999 | Tai | |
| 6,378,175 B1 | 4/2002 | Vanderpan | |
| D631,740 S * | 2/2011 | Wood ............................. | D8/396 |

FOREIGN PATENT DOCUMENTS

| | | | | |
|---|---|---|---|---|
| CH | 269995 A | 8/1950 | | |
| JP | 2010-51201 A | 3/2010 | | |
| NL | 1004850 C1 | 6/1998 | | |
| WO | WO-2006092828 A1 * | 9/2006 | ............. | A01G 17/08 |

* cited by examiner

*Primary Examiner* — Trinh T Nguyen
(74) *Attorney, Agent, or Firm* — Hoffmann & Baron, LLP

(57) ABSTRACT

A plant support collar for supporting plant stems includes a central frame. The collar further includes a first hook member and a second hook member extending from the central frame in different directions. The first hook member and the second hook member each have a free end, the free end together with the central frame defining a passage for accommodating plant stems in the respective hook member. The central frame includes a support area configured to abut an intersection of the stems.

14 Claims, 3 Drawing Sheets

PLANT SUPPORT COLLAR

CROSS-REFERENCE TO RELATED APPLICATIONS

This application is the National Stage of International Application No. PCT/EP2015/075776 filed Nov. 5, 2015, which claims the benefit of Netherlands Application No. NL 2013747, filed Nov. 6, 2014, the contents of which is incorporated by reference herein.

FIELD OF THE INVENTION

The invention relates to the field of agriculture, and more specifically to growing plants. More in particular, the invention relates to a plant support collar for supporting plant stems, in particular stems of a plant bearing heavy vegetables, such as a tomato plant, but not limited thereto.

BACKGROUND OF THE INVENTION

From practice, it is known to support plants stems such that they do not bend excessively or even crack under a load imposed by e.g. the stem itself, or vegetables growing on the stems. With some plants carrying vegetables such as tomatoes, cucumbers, peppers, courgettes, aubergines, etc., the stems are relatively fragile with respect to the vegetables. Without support at carefully selected locations on the stems, the plants would not be able to grow to their full extent, and such that the vegetables can be harvested in an efficient manner.

As an example, for the tomato industry, the Horticentre group (www.horticentre.co.nz) markets a "Bato" side shoot hook comprising an elongated body having opposite ends each provided with a hook member. The side shoot hook is made from a resilient deformable plastic material. The side shoot hook is used for maintaining an additional side shoot, by way of attaching the hook, to the main stem. For this purpose, the hook members are hooked around the adjacent stems to interlink the stems to provide mutual support.

A disadvantage of the known side shoot hook is that installing it is laborious. A further disadvantage is that the side shoot hook can move along the stems, rendering it less or not effective by a change of position thereof. This movement can only be prevented by secondary stems. However, such secondary stems are weak and can easily be broken. Another disadvantage of the side shoot hook is its relatively small cross-sectional area which leads to relatively high local pressure on the supported stem, with resulting local damage to the stem.

SUMMARY OF THE INVENTION

It would be desirable to provide an improved plant support collar, or at least an alternative plant support collar. It would also be desirable to provide a plant support collar which can be easily mounted on a plant. It would further be desirable to provide a plant support collar which will, once mounted, keep its position and does not move along the stems. It would further be desirable to provide a plant support collar that will not damage the stems with which it is in contact.

To better address one or more of these concerns, in a first aspect of the invention a plant support collar for supporting plant stems is provided that comprises: a central frame; a first hook member and a second hook member extending from the central frame in different directions, wherein the first hook member and the second hook member each have a free end, each free end together with the central frame defining a passage for accommodating plant stems in the respective first and second hook member, wherein the central frame comprises a support area configured to abut an intersection of the stems.

The plant support collar of the present invention will, in use, accommodate plant stems, at least one per hook member. The plant stems rest against an inner surface of the associated hook member, whereby the collar mechanically connects different plant stems to each other. By this connection brought about by the collar, one plant stem will support another plant stem. By the same connection, the plant stems will also be guided (to grow) in a preferred direction determined by the configuration of the first and second hook members of the collar. The central frame may rest on an intersection of the stems, whereby the collar can maintain its position relative to the plant stems that it supports. In other words, the collar cannot move, either by the force of gravity or by other forces, or by the plant growing process or other influences which will effect a change in position or orientation of the plant stems, downwards to become ineffective in its intended plant support function.

In an embodiment of the collar, the support area of the central frame comprises a concave surface. Advantageously, the concave surface provides the support area with a stable grip on the usually fork-shaped intersection of the plant stems to be supported, between the bases of the plant stems. Shifting or tilting of the collar is prevented.

In an embodiment of the collar, the central frame comprises a front support protrusion and a back support protrusion on opposite sides of the support area. Advantageously, the front and back support protrusions further stabilize the position of the collar on the intersection of the plant stems, and prevent shifting, or tilting of the collar.

In an embodiment of the collar, the passage defined by each hook member and the central frame has a width which is smaller than an expected thickness of a stem to be supported. Thus, when a stem is to be placed in one of the first and second hook members, the passage, or entrance, should be widened to allow the stem to enter the area delimited by the hook member through the passage. For this purpose, the hook member is bent to bring its free end away from the central member. With a resilient hook member, after the stem has moved through the passage, the hook member will come back to its original position, thereby preventing the stem to leave the area delimited by the hook member. The process of inserting a stem into a hook member can also be referred to as snapping a hook member on a stem. Herewith, a connection between the stem and the hook member is made, wherein the hook member still is quite movable relative to the stem, in particular when the area delimited by the hook member has cross-sectional dimensions which are (substantially) greater than the cross-sectional dimensions of the stem. The connection can only be released when the stem is forced out of the hook member through the passage.

In an embodiment of the collar, the free ends each are bent back to face away from the central frame to facilitate the plant stems to enter the passage without damage to the plant stems. Advantageously, the free end of a hook member being bent back provides a guide for a stem when making the stem move through the passage defined by the free end and the central frame. Damage to the stem, e.g. by the free end of the hook member piercing the stem, thus can be avoided or prevented.

In an embodiment of the collar, the first hook member and the second hook member each have an planar inner surface configured to abut a plant stem. Advantageously, the planar surface provides a relatively large surface area to be in contact with a plant stem, leading to a relatively low surface pressure on the plant stem. Thus, damage to the stem can be avoided or prevented, even when the hook member is forced against the stem with a relatively high force.

In an embodiment of the collar, the inner surface of each hook member has a conical shape. Advantageously, with a conical shape of the inner surface of the hook member, in particular flaring out in a direction away from the support area of the central frame, the inner surface is well-adapted to a general orientation of the stem surface that it is to support, when different stems divert from their intersection at an acute angle to each other. Another advantage of the conical shape arises when the collar is made in an injection molding process, where the conical shape promotes the mold product to leave the mold.

In an embodiment of the collar, the first hook member and the second hook member are strip-shaped. Advantageously, the strip shape provides a planar inner surface configured to abut a plant stem, and the strip shape can be formed in a conical way, as required above.

In an embodiment of the collar, the first hook member and the second hook member each are provided with a finger on their outer surface, the finger having a free end, wherein the fingers are configured to widen the passage between the free ends of the first and second hook members and the central frame upon pushing the free ends of the fingers towards each other. Advantageously, the widening of the passage can be performed by gripping the collar, made from a resilient material, by hand while placing the tips of the thumb and one of the fingers of the hand on the (free ends of the) fingers of the collar, and moving the thumb and the one of the fingers of the hand towards each other. As a result, the free ends of the first and second hook members move away from each other and the passage is enlarged, and a stem can even pass a passage without the collar substantially touching the stem.

In an embodiment of the collar, the fingers are strip-shaped. Advantageously, a comfortable grip on the fingers is provided, where a contact surface area of a tip of a thumb or finger of a human hand on a collar finger is relatively large.

In an embodiment of the collar, the collar fingers, at sides facing away from each other, each are provided with a grip member. Advantageously, the grip member, which may comprise a protrusion or a recess or other profiling of the collar finger prevent the collar finger to slip away from the grip of a human hand.

In a second aspect of the invention, a method for producing the plant support collar according to the invention is provided, wherein the collar is manufactured in a molding process, in particular in an injection molding process. Advantageously, the plant support collar can be made in high quantities at low costs in a molding process.

In a third aspect of the invention, a method for producing the plant support collar according to the invention is provided, wherein the collar is manufactured in a 3D printing process. Advantageously, in a 3D printing process, the plant support collar can be manufactured locally in a measured quantity as desired.

In an embodiment of any one of the methods of the invention, the collar is made from a plastic material. With proper dimensioning and choice of material, the plastic material provides a balance between rigidity and flexibility, strength, weight and other desired properties.

In an embodiment of any one of the methods of the invention, the collar is made from a weather resistant material. The plant support collar can be used both inside a growing house or outside in an open area. For a versatile collar, it can withstand all circumstances and be used reliably for a long time. For these reasons, the collar advantageously is weather resistant.

In an embodiment of any one of the methods of the invention, the collar is made from polyamide, which is an advantageous material to manufacture the collar to provide most of the previously mentioned properties, and can be used in an injection molding process as well as a 3D printing process.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Herein, expressions such as "top", "bottom", "front" and "back" refer to an intended use orientation of the plant support collar of the invention.

Figure 1:
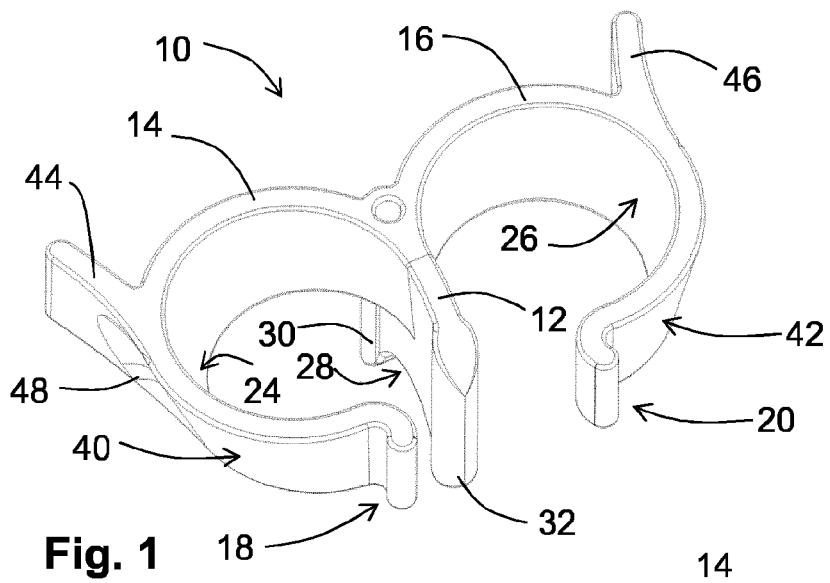
FIG. 1 depicts a top and back perspective view of a first embodiment of a plant support collar of the present invention.
Figure 2:
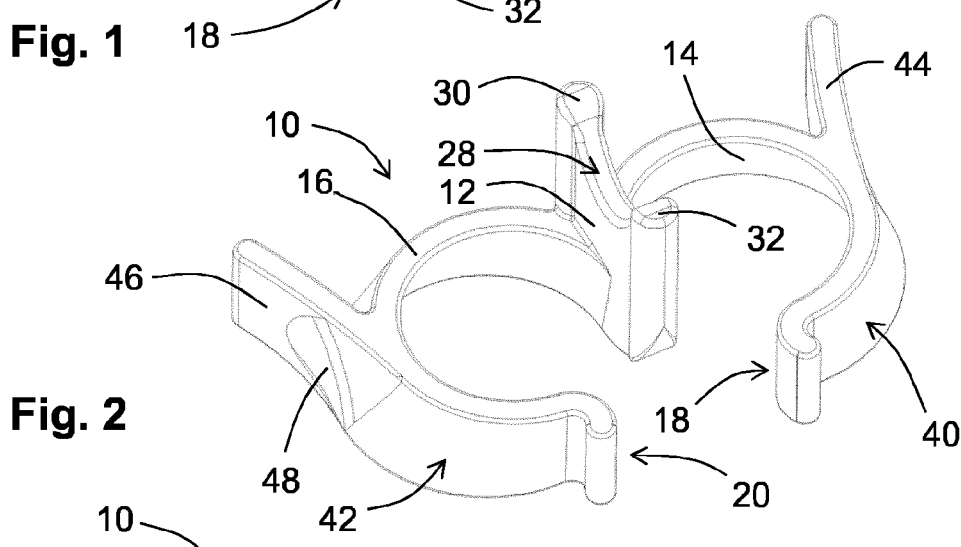
FIG. 2 depicts a bottom and back perspective view of the embodiment of the plant support collar according to FIG. 1.
Figure 3:
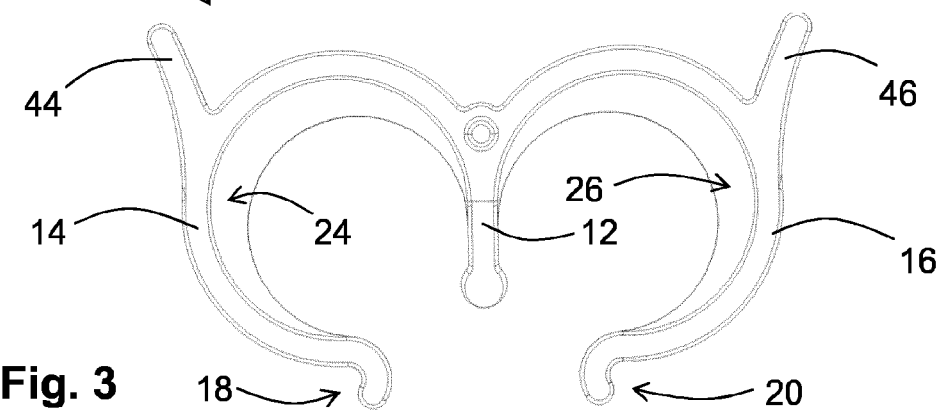
FIG. 3 depicts a top view of the embodiment of the plant support collar according to FIG. 1.

FIGS. 1-3 depict a plant support collar 10 comprising a central frame 12, a first hook member 14, and a second hook member 16.

The first hook member 14 and the second hook member 16 are fixed to the central frame 12, and extend from the central frame 12 in different directions, such as to form a construction that is mirrored or symmetrical relative to the central frame 12. The first hook member 14 and the second hook member 16 each are strip-shaped, providing an inner surface at the concave side of the first and second hook members 14, 16, and an outer surface at the convex side of the first and second hook members 14, 16.

The first hook member 14 and the second hook member 16 each have a free end 18, 20, respectively. Each free end 18, 20 together with the central frame 12 defines a passage for accommodating plant stems in the respective hook member 14, 16. Each passage has a width which is smaller than an expected thickness of a stem to be supported.

The free ends 18, 20 of the first hook member 14 and the second hook member 16, respectively, each are bent back, i.e. extend away from the central frame 12 to facilitate the plant stems to enter the passage without damage to the plant stems. For the same reason, the central frame 12 comprises a V-shaped back side 22. Said back side 22, and one of the free ends 18, 20, provide guides, or guide surfaces, for a stem to be guided into the corresponding passage.

With the strip-shaped first hook member 14 and second hook member 16, the first hook member 14 and the second hook member 16 each have an planar inner surface 24, 26, respectively, configured to abut a plant stem. Since the plant stems to be supported in the first hook member 14 and the second hook member 16 originate from a stem intersection to grow in a diverging way, for an optimum support of the plant stems by the first hook member 14 and the second hook member 16, the corresponding respective inner surfaces 24, 26 have a conical shape, as shown in particular in FIG. 3.

The central frame 12 comprises, at the bottom thereof, a support area 28 configured to abut an intersection of plant stems to be supported in the first hook member 14 and second hook member 16. The support area 28 comprises a concave surface. In another embodiment, the support area may be shaped differently, such as flat. The central frame 12 comprises a front support protrusion 30 and a back support protrusion 32 on opposite ends of the support area 28.

The first hook member 14 is provided, on an outer surface 40 thereof, i.e. on a surface facing away from a stem to be supported (see FIGS. 3, 4), with a first finger 44 having a free end, and extending at a first angle to the outer surface 40. According to FIGS. 1, 2, the first angle is an acute angle, and is selected to be between 45° and 90°. Similarly, the second hook member 16 is provided, on its outer surface 42, with a second finger 46 having a free end, and extending at a second angle to the outer surface 42. According to FIGS. 1, 2, the second angle is an acute angle, and is selected to be between 45° and 90°.

The first and second fingers 44, 46 each have a strip-like shape having two opposite sides, i.e. an outer side facing away from the other finger 46, 44, and an inner side facing the other finger 46, 44. The first and second fingers 44, 46 each are provided with a grip member formed as a protrusion 48 at their outer side. In other embodiments, instead of a protrusion, a recess or any other surface profile may be provided at the outer side of the first and second fingers 44, 46. The first finger 44 generally extends parallel to, or at a small angle, selected to be between 0° and 30°, to the second finger 46.

The fingers 44, 46 are fixed to the first hook member 14 and the second hook member 16, respectively, and are configured to widen the passage between the free ends 18, 20 of the first and second hook members 14, 16 and the central frame 12 upon pushing the free ends of the fingers 44, 46 towards each other.

Figure 4:
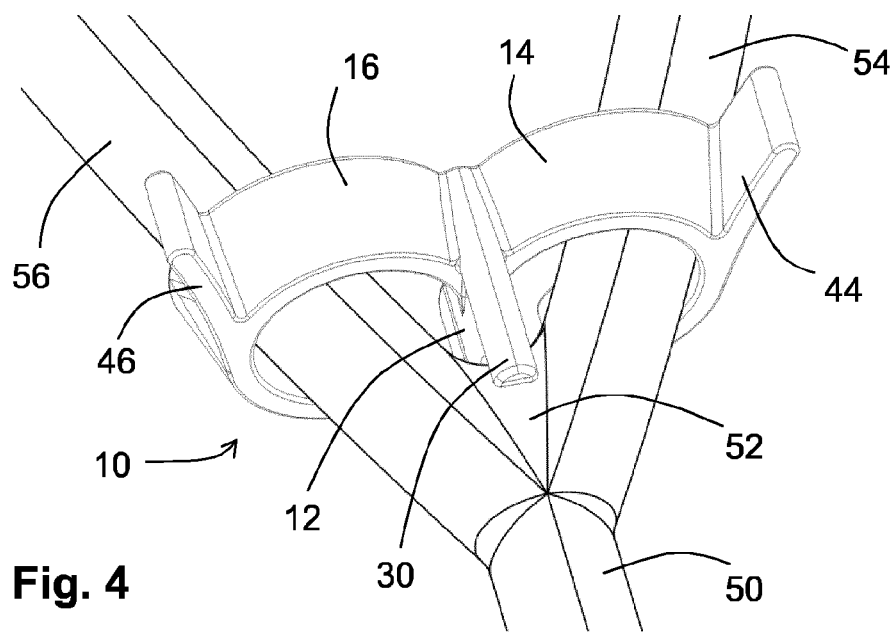
FIG. 4 shows a first perspective view illustrating a use of the embodiment of the plant support collar according to FIGS. 1-3.
Figure 5:
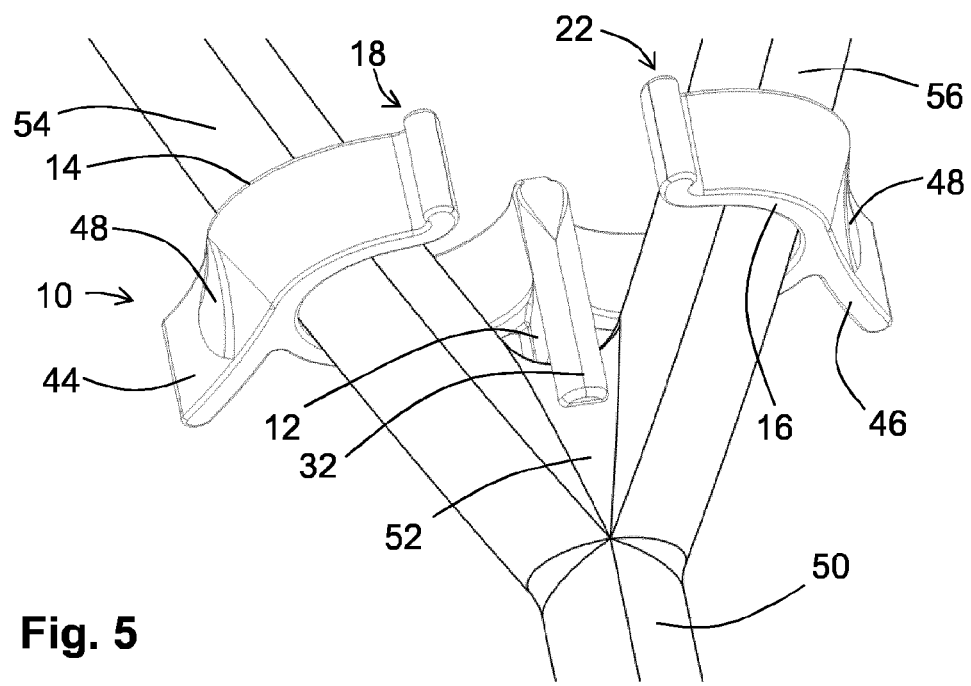
FIG. 5 shows a second perspective view illustrating the use of the embodiment of the plant support collar according to FIGS. 1-3.

FIGS. 4 and 5 illustrate the use of the plant support collar 10 on a plant having a central stem 50 which, at an intersection 52, diverges into secondary stems 54, 56.

The plant support collar 10 is mounted on the plant as follows. A person grips the plant support collar 10 with the ends of the collar fingers 44, 46 thereof placed between the thumb and one of the fingers of the person's hand. Then, the ends of the collar fingers 44, 46 are pushed towards each other. This will move the free ends 18, 20 of the first hook member 14 and the second hook member 16 away from each other while deforming the first hook member 14 and the second hook member 16 in the parts thereof between the fingers 44, 46 and the central frame 12. When the free ends 18, 20 of the first hook member 14 and the second hook member 16 move away from each other, the passage between the free end 18 and the central frame 12, and the passage between the free end 20 and the central frame 12 each widen. In this condition of the plant support collar 10, having the passages widened, the plant support collar 10 is mounted on the secondary stems 54, 56, and positioned such that the support area 28 contacts the stem intersection 52, with the front support protrusion 30 and the back support protrusion 32 extending downwards along opposite sides of the stem intersection 52. The collar fingers 44, 46 can be released when the secondary stems 54, 56 have been accommodated in the first and second hook members 14, 16.

In the mounting position, the plant support collar 10 supports the secondary stems 54, 56 near the stem intersection 52. Additionally, the plant support collar 10 may guide the secondary stems 54, 56 to grow essentially upwards. During growth, the plant support collar 10 will essentially not move, shift or tilt thanks to the contact surfaces between the plant and the collar 10 at the inner surfaces 24, 26 of the first and second hook members 14, 16, at the support area 28 of the central frame 12, at the front support protrusion 30, and at the back support protrusion 32.

Figure 6:
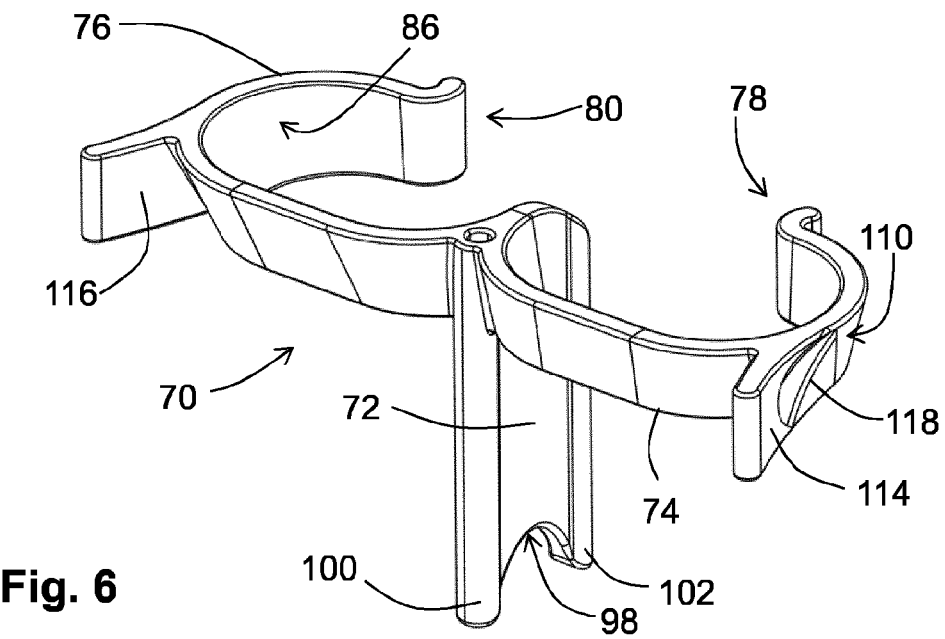
FIG. 6 depicts a top and front perspective view of a second embodiment of a plant support collar of the present invention.
Figure 7:
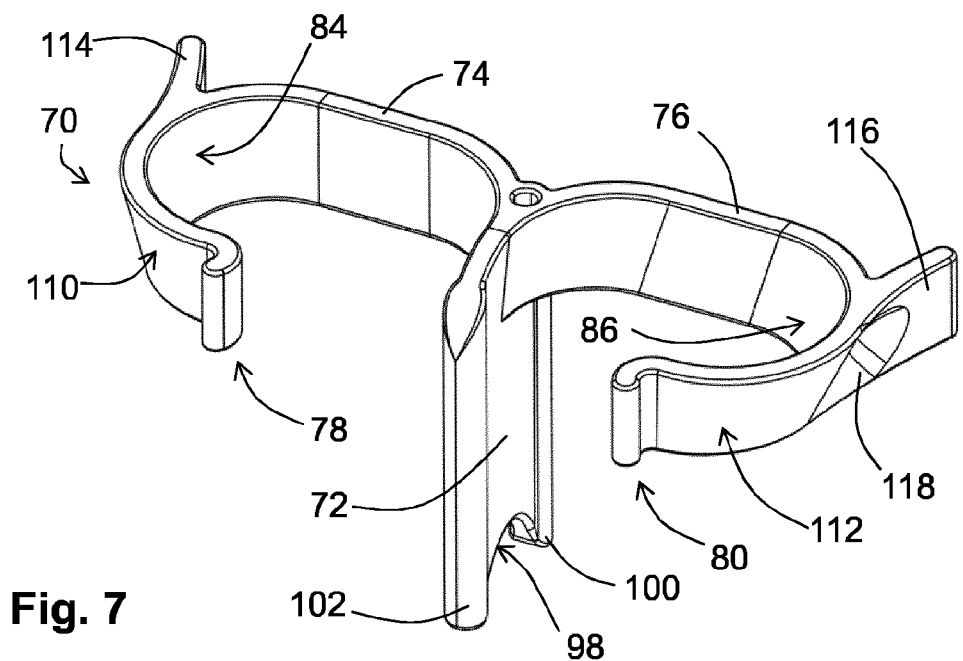
FIG. 7 depicts a top and back perspective view of the embodiment of the plant support collar according to FIG. 6.

As illustrated in FIGS. 6 and 7, another embodiment of the plant support collar 70 comprises a central frame 72 with support area 98, first hook member 74 with free end 78 and inner surface 84 and outer surface 110, second hook member 76 with free end 80 and inner surface 86 and outer surface 112, front support protrusion 100, back support protrusion 102, and fingers 114, 116 with protrusions 118.

Plant support collar 70 has a central frame 72 which has a larger height than the central frame 12 of plant support collar 10. Furthermore, plant support collar 70 has first and second hook members 74, 76 which will support secondary stems 54, 56 at a greater distance from the stem intersection 52 than the first and second hook members 14, 16 of the plant support collar 10, since a part of the first and second hook members 74, 76 extending between the central frame 72 and the respective fingers 114, 116 has been extended relative to the corresponding part of the first and second hook members 14, 16 of the plant support collar 10.

The plant support collar 10, 70 may be made from a plastic, weather resistant material, such as polyamide, in an injection molding process, or in a 3D printing process.

As explained in detail above, a plant support collar for supporting plant stems comprises a central frame. The collar further comprises a first hook member and a second hook member extending from the central frame in different directions. The first hook member and the second hook member each have a free end, the free end together with the central frame defining a passage for accommodating plant stems in the respective hook member. The central frame comprises a support area configured to abut an intersection of the stems.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A plant support collar for supporting plant stems, the collar comprising:
   a central frame;
   a first hook member and a second hook member extending from the central frame in different directions, wherein the first hook member and the second hook member each have a free end, each free end together with the central frame defining a passage for accommodating plant stems in the respective hook member,
   wherein the central frame comprises a support area configured to abut an intersection of the stems; and
   wherein the central frame comprises an elongate front support protrusion and an elongate back support protrusion on opposite sides of the support area; and
   wherein the front support protrusion and the back support protrusion at a distance from each other both protrude downwardly beyond the support area.

2. The collar according to claim 1, wherein the support area comprises a concave surface.

3. The collar according to claim 1, wherein the passage has a width which is smaller than an expected thickness of a stem to be supported.

4. The collar according to claim 1, wherein the free ends each are bent back to face away from the central frame to facilitate the plant stems to enter the passage without damage to the plant stems.

5. The collar according to claim 1, wherein the first hook member and the second hook member each have a planar inner surface configured to abut a plant stem.

6. The collar according to claim 5, wherein the inner surface has a conical shape.

7. The collar according to claim 1, wherein the first hook member and the second hook member are strip-shaped.

8. The collar according to claim 1, wherein the first hook member and the second hook member each are provided with a finger on their outer surface, the finger having a free end, wherein the fingers are configured to widen the passage between the free ends of the first and second hook members and the central frame upon pushing the free ends of the fingers towards each other.

9. The collar according to claim 8, wherein the fingers are strip-shaped.

10. The collar according to claim 8, wherein the fingers, at sides facing away from each other, each are provided with a grip member.

11. A method for producing a plant support collar for supporting plant stems, the collar comprising:
    a central frame comprising a support area configured to abut an intersection of a plant stem;
    a first hook member and a second hook member extending from the central frame in different directions, wherein the first hook member and the second hook member each have a free end, each free end together with the central frame defining a passage for accommodating plant stems in the respective hook member, wherein the central frame comprises an elongate front support protrusion and an elongate back support protrusion on opposite sides of the support area, and wherein the front support protrusion and the back support protrusion at a distance from each other both protrude downwardly beyond the support area,
    the method comprising manufacturing the collar in a molding process, in particular in an injection molding process.

12. The method according to claim 11, wherein the collar is made from a weather resistant material, in particular from a plastic material, more in particular from polyamide.

13. A method for producing a plant support collar for supporting plant stems, the collar comprising:
    a central frame comprising a support area configured to abut an intersection of a plant stem;
    a first hook member and a second hook member extending from the central frame in different directions, wherein the first hook member and the second hook member each have a free end, each free end together with the central frame defining a passage for accommodating plant stems in the respective hook member, wherein the central frame comprises an elongate front support protrusion and an elongate back support protrusion on opposite sides of the support area, and wherein the front support protrusion and the back support protrusion at a distance from each other both protrude downwardly beyond the support area,
    the method comprising manufacturing the collar in a 3D printing process.

14. The method according to claim 13, wherein the collar is made from a weather resistant material, in particular from a plastic material, more in particular from polyamide.

* * * * *